Sept. 20, 1955　　　W. L. REITER ET AL　　　2,718,095
MOLDING MACHINE FOR SEALING METAL
LEADS THROUGH A GLASS DISC
Filed Feb. 1, 1947　　　　　　　　　　　　5 Sheets-Sheet 1

INVENTORS
*William Leroy Reiter*
*Stanley J. Gartner*
*Henry W. Roeber*
BY
*Their Attorney*

Sept. 20, 1955

W. L. REITER ET AL 2,718,095

MOLDING MACHINE FOR SEALING METAL
LEADS THROUGH A GLASS DISC

Filed Feb. 1, 1947

INVENTORS
William Leroy Reiter
Stanley J. Gartner
Henry W. Roeber
BY
Their Attorney

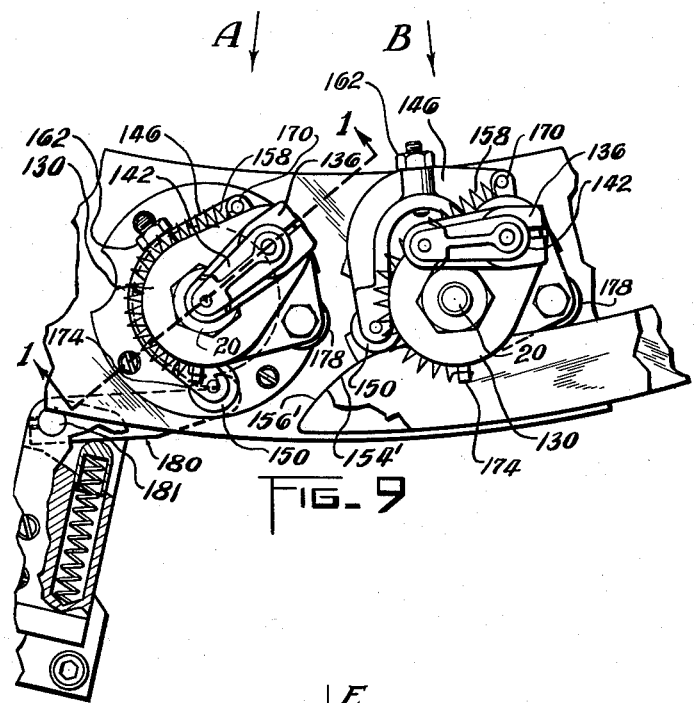
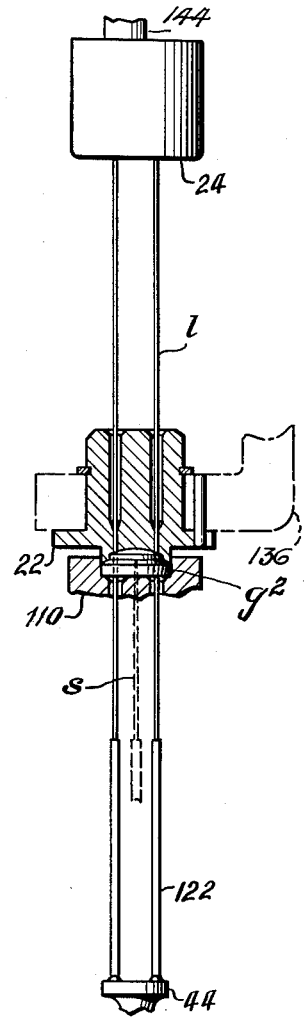
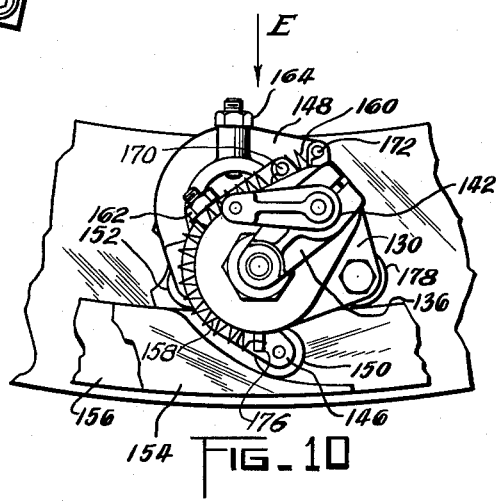
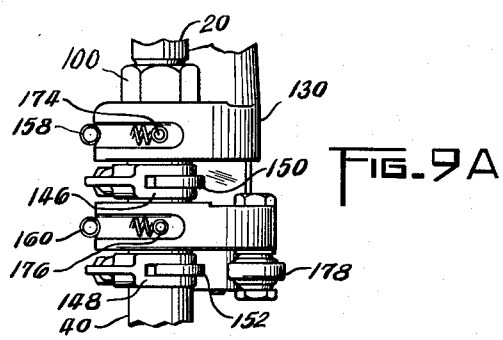

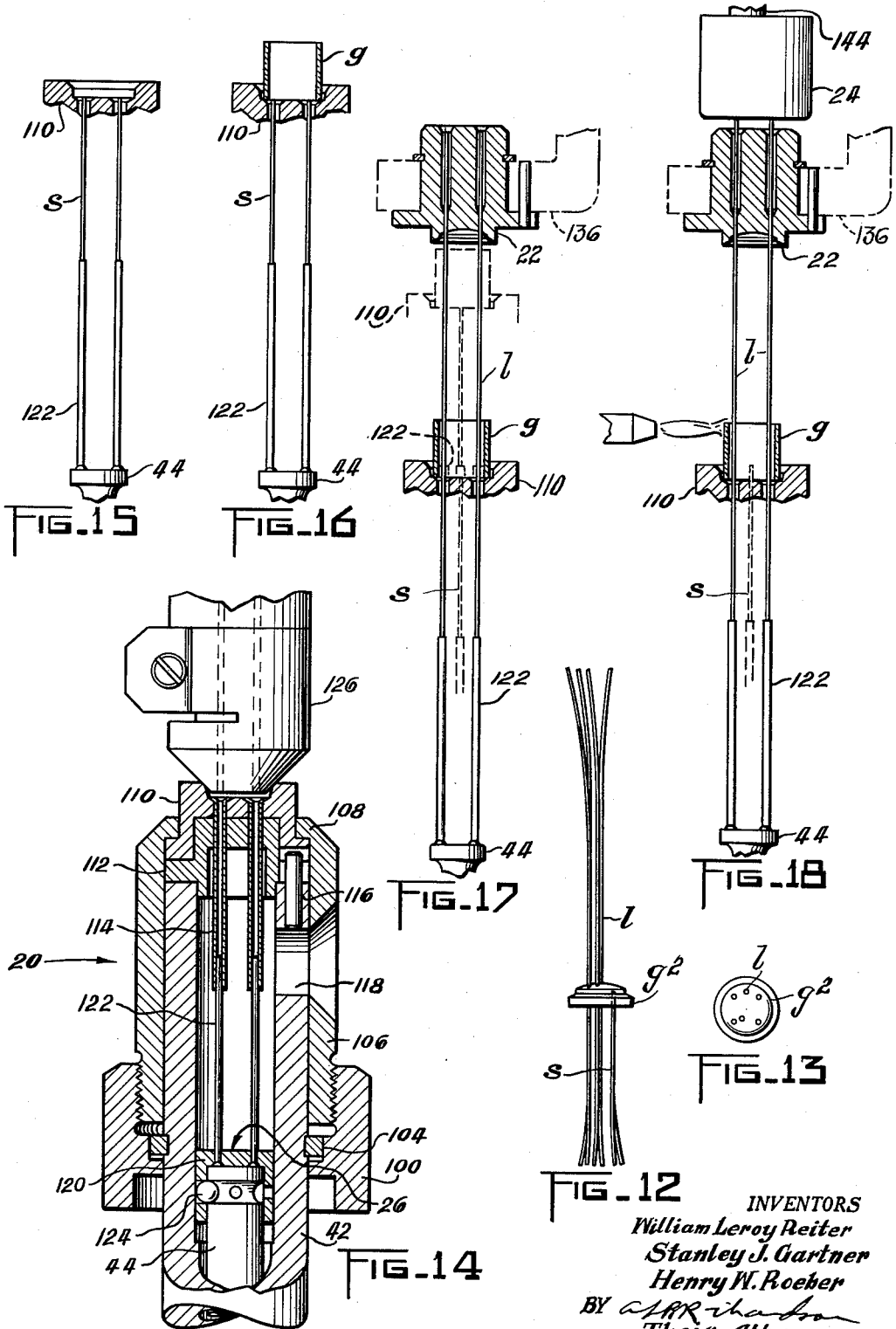

Sept. 20, 1955 W. L. REITER ET AL 2,718,095
MOLDING MACHINE FOR SEALING METAL
LEADS THROUGH A GLASS DISC
Filed Feb. 1, 1947 5 Sheets-Sheet 5

INVENTORS
William Leroy Reiter
Stanley J. Gartner
Henry W. Roeber
BY
Their Attorney United States Patent Office 2,718,095
Patented Sept. 20, 1955

2,718,095

MOLDING MACHINE FOR SEALING METAL LEADS THROUGH A GLASS DISC

William Leroy Reiter, Stanley J. Gartner, and Henry W. Roeber, Emporium, Pa., assignors to Sylvania Electric Products, Inc., a corporation of Massachusetts Application February 1, 1947, Serial No. 725,894

16 Claims. (Cl. 49—1)

This invention relates to molding machines and more particularly to machines for sealing metal leads transversely through a glass plug, to form a header for radio tubes and like devices. In radio tube practice the header, when sealed to a shell, constitutes an envelope; and the envelope is evacuated through an exhaust tube in either the shell or the header to form a vacuum tube with enclosed electrodes. The tube is optionally charged with certain gases. The invention will undoubtedly be found of value in molding articles other than headers.

One prior art type of machine for making headers or the like includes a turret for carrying a plurality of spindles, each spindle comprising upper and lower mold cavities, both cavities having bores for receiving the metal leads which are to be sealed into molded glass. Since the mold cavities are in vertical alignment, their loading and unloading is difficult unless they are spaced widely apart, and therefore are mutually reciprocated through a long stroke during the pressing operation. It is an object of the present invention to improve the accessibility of two-part molds in multiple-spindle machines. This feature of accessibility is particularly important where long leads are involved, although it is of importance even where no leads at all are involved and where only a glass charge is to be loaded into the lower mold.

The prior art molding machines are designed to make headers with short, stiff leads. These can be loaded into one mold and by virtue of their stiffness they can be relied on to enter the bores in the coacting mold parts during the molding cycle. It is another object of the present invention to provide a novel apparatus for molding headers with leads that may be too long and thin to be relied on for stiffness.

An additional object is to provide mechanism for orienting the spindles, after their rotation has been arrested and the completed header or the like has been removed, so that the bores in the mold are in proper position to receive the wires whether stiff or not. Correct orientation of the spindles is especially important where an automatic wire feeder is used.

A further object is to provide more uniform heating of the glass, and for shaping it, whereby the process may be effected without excessive local heat intensities, and to provide apparatus for automatically achieving this purpose.

A more general purpose is to provide a new and useful automatic molding machine. This and further objects and features of novelty will become apparent from the illustrative embodiment described briefly and in detail below.

The illustrative embodiment includes a carrier for intermittently advancing multiple spindles successively past a series of loading stations, burners and press positions. Each spindle includes a two-cavity mold, the upper cavity of which is pivotally mounted for lateral shifting from the spindle axis to improve the accessibility of the lower mold. This facilitates the removal of the molded product and the loading of a new glass charge. Where metal inserts are to be loaded this accessibility is likewise an advantage.

The mold is rotated during the heating and pressing sequence. It is arrested, and is so positioned with respect to the turret by a cam track cooperating with followers on each spindle so that another cam track, which laterally shifts the upper mold, will properly coact with its follower. These cam mechanisms also arrange the mold cavities so that their bores are in proper positions to receive the wires.

In the present instance short and long wires are to be inserted into the mold. The short ones which are to have one end molded into the glass are inserted while the top mold is laterally displaced. The long wires which are to extend away from the glass at top and bottom require lateral support during their insertion into the lower mold. There should also be assurance that the long wires will find their way into the bores in the top mold. To this end the bores extend axially all the way through the top mold. The two cavities are arranged in axial alignment and moved close to each other while the wires are fed down through the top mold and into the bores in the bottom mold. Thereafter a pressure block is shifted to rest on the ends of the wires projecting above the top mold. Subsequently the spacing between the two parts of the mold is increased to expose the glass stock to effective heating.

The glass stock is loaded into the bottom mold in the form of a ring or short tube prior to the insertion of the long wires. Its upper edge is softened, once its spindle is carried by the turret to the preheating burners and its rotation has started. Thereafter the shaping is effected by progressive presses, preferably effected while the carrier is in transit. The two cavities of the mold are pressed toward each other by coaction of a cam-follower on each spindle with a resilient section of cam track, although a rigid cam with a yieldable mold support would serve the same purpose in more complex fashion. This is to mold the softened part of the glass charge without fracturing the part that may still be hard.

Prior to or during the first press the glass stock is adhered to the long wires. During the subsequent heating intervals, as well as during the annealing interval following the final press, the glass is spaced from the bottom mold cavity for uniform exposure to the burners. This is effected by relative axial reciprocation of a support for the wires and the lower mold cavity; more specifically by elevating the wires while retaining the lower mold at a fixed level.

The mechanism embodying the various aspects of their invention will be better appreciated from the following detailed disclosure. In the drawings:

Fig. 9 is a plan view of two spindles carried by the turret as they appear in stations A and B of Fig. 8.

Fig. 9A is an elevation showing the cam followers of the spindle to the left in Fig. 9.

Fig. 10 is a plan view of the spindle at station E of Fig. 8.

Fig. 11 is a view, partly in section, of certain of the mold parts during the final press.

Figs. 12 and 13 are elevational and plan views respectively of a completed header.

Fig. 14 is an enlarged view of the lower mold with the delivery end of the short wire feeding means in loading position.

Figs. 15 to 17 inclusive diagrammatically show the successive operations involved in loading the mold.

Figure 18 shows the relationship of the parts loaded into the molds as heating operations are begun.

Figure 19:
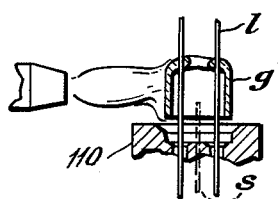
Figure 20:
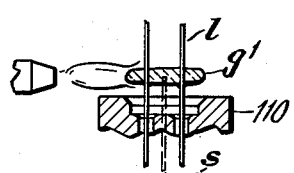
Figure 21:
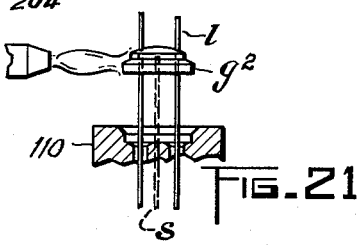

Figs. 19 and 20 show the glass following two preliminary presses, while Fig. 21 shows the completed header during the final annealing operation.

Figure 22:
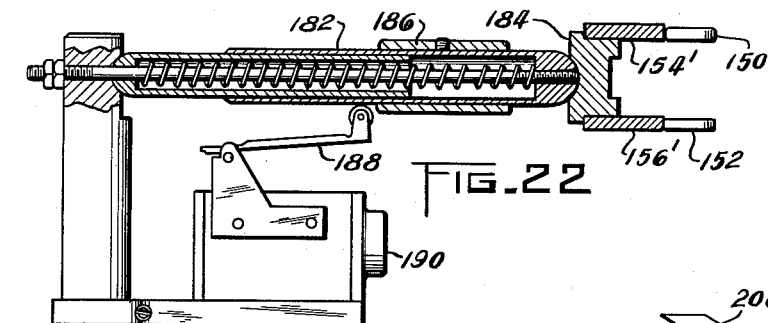

Fig. 22 is an elevation, partly in section, of a safety device associated with movable sections of the upper cam tracks.

Figure 23:
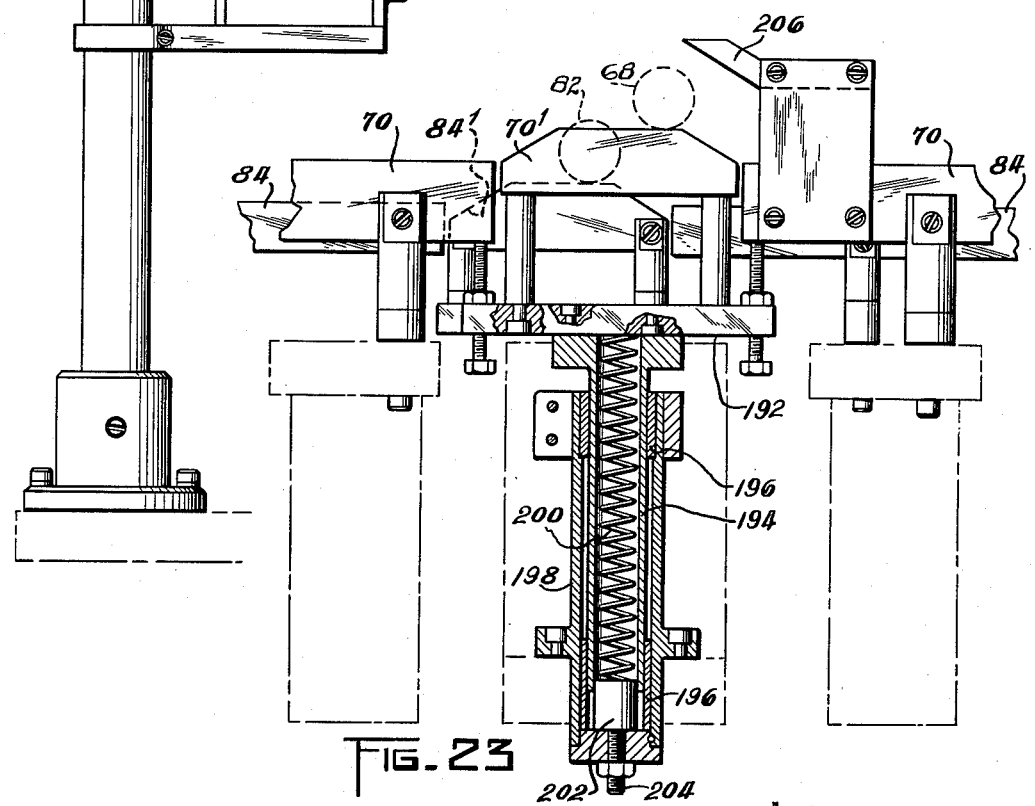

Fig. 23 is an elevation, partly in section, showing yieldable supports for the lower cam tracks.

The two-cavity mold forms part of a spindle which is rotated while opposite a series of burners. Each spindle includes a lower mold 20, an upper mold 22, and a pressure pad 24. The latter two elements are mounted for swinging in a horizontal plane between a position of clearance and a position directly above lower mold 20, and also for coaxial rotation as a unit with lower mold 20. Rotatable with the lower mold is a support 26 for positioning the lower ends of the wires that are to be molded into the header. Lower mold 20 and support 26 are vertically slidable for various functions to be described.

Figure 8:
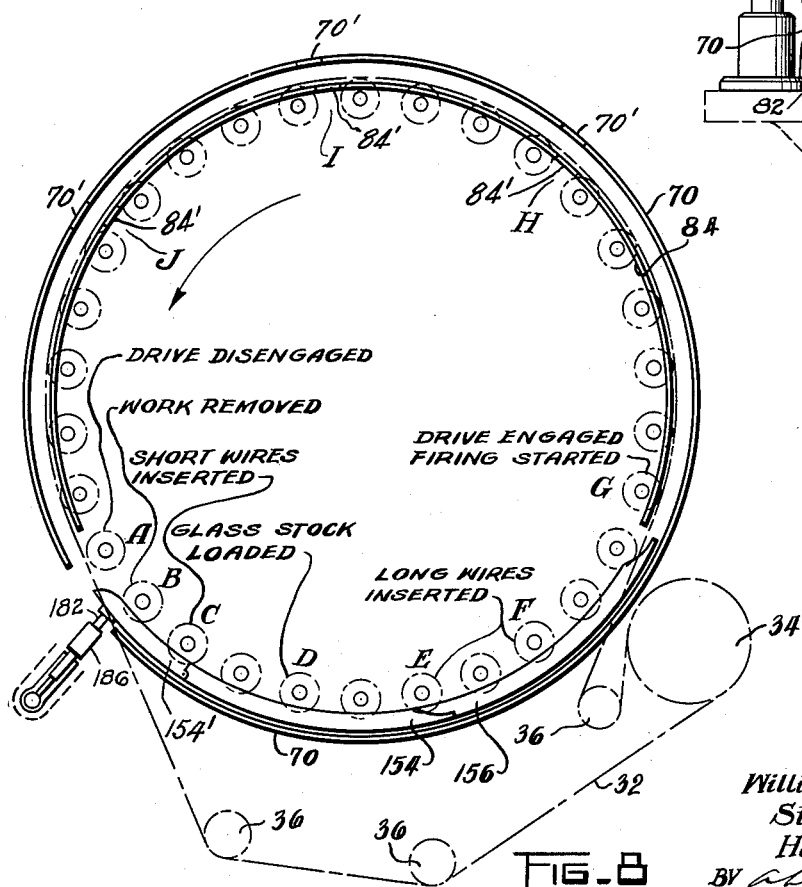
Fig. 8 is a schematic plan view of the entire machine showing the cam tracks, the drive, and the positions assumed successively by each of the spindles on the turret.

Two flanges 28 of a turret 30 support a plurality of spindles, thirty spindles or rotatable mounting means for the molds being shown in Fig. 8. The turret is indexed to move each spindle opposite a number of loading and work stations by means described in copending application Serial No. 635,889, filed December 19, 1945, by Stanley J. Gartner and now Patent No. 2,588,977, granted March 11, 1952. The spindles are continuously rotated during the preliminary heating and forming operations, but are not rotated during the work removal and loading operations. Rotation is effected by means of a chain 32 driven by sprocket 34, and tensioned about idlers 36, and about pinions 38 which are rotatable on their spindles.

*Lower mold construction and drive*

Figure 1:
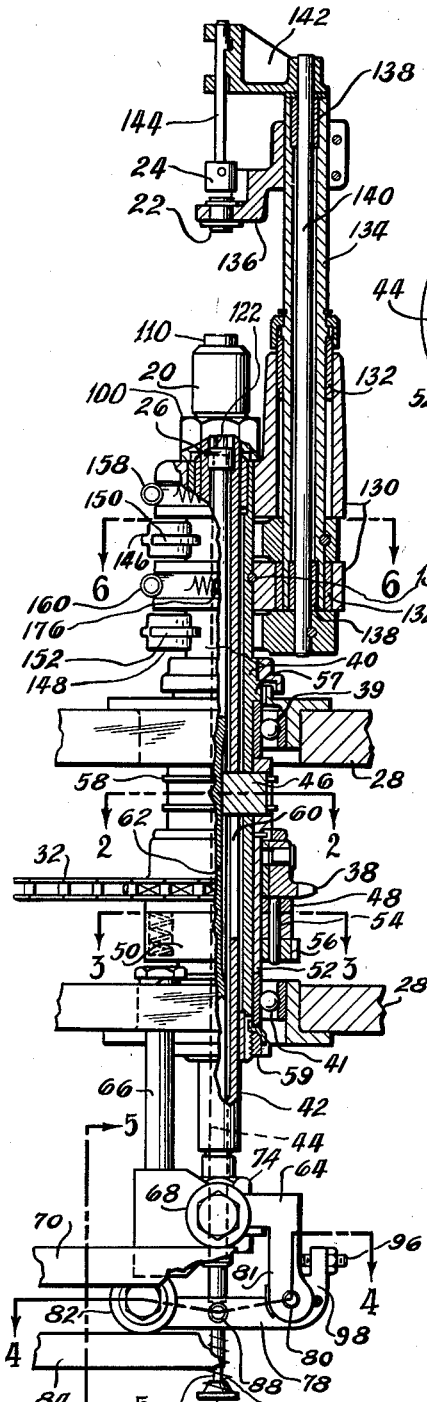
Fig. 1 is an elevation, partly in section, of a spindle in a preliminary heating position, the view and section being in the direction of section line 1—1 of Fig. 9.
Figure 2:
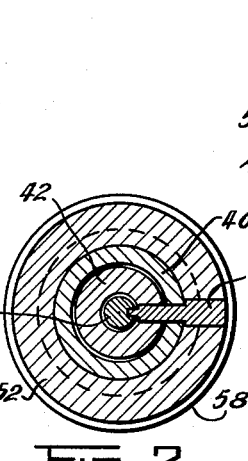
Figs. 2 to 6 are sectional views taken along the lines 2—2, 3—3, 4—4, 5—5, and 6—6 in Fig. 1.
Figure 3:
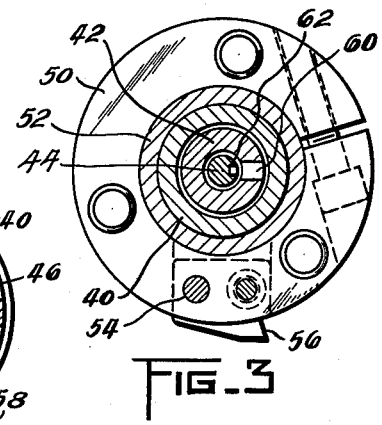
Figure 4:
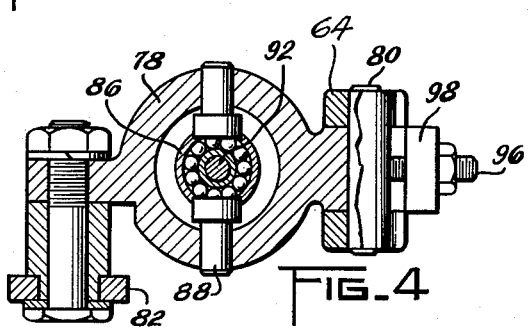
Figure 5:
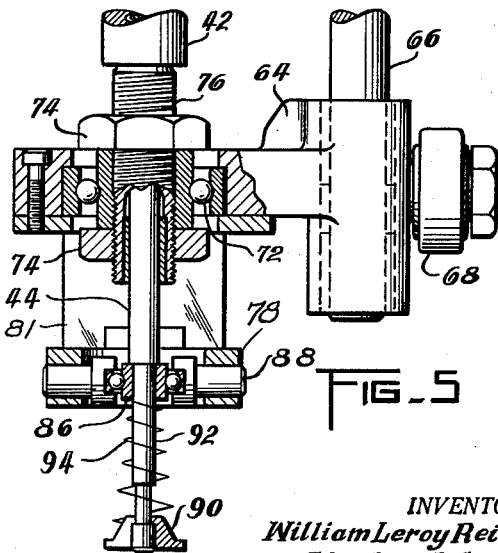

Each spindle comprises an outer hollow shaft or shell 40 supported in bearings 39 and 41, an inner shell 42, upon which is mounted mold 20, and a central shaft 44, held together by key 46 for rotation as a unit. Rotation is imparted by pinion 38 acting through spring-pressed friction disc 48, a clutch plate in the form of a clamping ring 50, sleeve 52, and key 46. Pin 54 insures rotation of clamping ring 50 with driven friction disc 48. By virtue of tooth 56 (Figs. 1 and 3) also secured to clamping ring 50, rotation of the spindle can be interrupted by an external latch even though drive of pinion 38 by chain 32 may continue. A pair of rings 58 retain key 46 against radial removal. Most of the weight of the spindle is carried by shoulder 57 on shaft 40, transmitted via bearings 39 and 41 to plates 28 of the turret. The lower end of shaft 40 is threaded to receive lock nut 59, thereby clamping sleeve 52 and bearings 39 and 41 against shoulder 57.

Inner shell 42 and shaft 44 are vertically slidable within outer shell 40 by virtue of slot 60 and keyway 62 in shell 42 and shaft 44 respectively. Shell 42 is secured within bearing block 64 for vertical motion therewith but bearing block 64 is held against rotation by shaft 66 which is secured to lower plate 28 of the turret. The rise of bearing block 64 along rod 66 is determined by anti-friction cam follower 68 in its coaction with cam track 70. Cam track 70 preferably is a continuous ring of metal arranged coaxially with turret 30. The upper surface of the cam 70 is so profiled as to lift and lower follower 68 as may be required. Such operation is described in more detail later. Inner shell 42 is adjustably secured to friction bearing 72 in block 64 by jam nuts 74 on the threaded lower end 76 thereof. Lower mold 20 is carried by inner shell 42 so that its level may be accurately adjusted; and that level is varied as cam follower 68 moves along cam track 70 during the cyclic travel of the spindle with turret 30.

Inner shaft 44 is supported at its lower end by lever 78 carried by pivot 80 in block 64 while the opposite end of lever 78 is supported by antifriction cam follower 82 in engagement with cam track 84. The lower end of shaft 44 rests on antifriction bearing 86 the outer race of which is carried by pivots 88 in lever 78. The necked-down portion 92 of shaft 44 is slidable in bearing 86 and has an enlarged foot 90. Compression spring 94, between foot 90 and bearing 86, holds the shouldered portion against bearing 86. By virtue of follower 82 and cam 84, shaft 44 is variously caused to rise and fall relative to shell 42. The lowermost descent of shaft 44 with respect to shell 42 is limited by a screw 96 threaded into an upstanding projection 98 of lever 78, the screw bearing against depending portion 81 of bearing block 64. This limited drop of shaft 44 with respect to shell 42 is maintained irrespective of the level of bearing block 64 as determined by cam track 70. It will be understood however, that shaft 44 can be raised above this lowermost limit by cam 84, for purposes to be stated.

Shaft 44 controls the level of various wires which are loaded into the lower mold. The lower mold assembly (Fig. 14) is retained on the upper end of shell 42 by nut 100 and sleeve 106 to embrace split ring 104 which is fixed in a groove around shell 42. At its upper extremity sleeve 106 has an overhanging lip 108 for retaining lower mold cavity 110 and support 112 for tubes 114 against the upper end of shell 42. Pin 116 assures proper orientation of members 110 and 112 on the end of shell 42.

At the upper end of shaft 44 is the wire support 26, comprising a cap 120 carrying pins 122 slidable within tubes 114. Cap 120 is keyed to the top end of shaft 44 by ball 124, which nonetheless allows rotation of cap 120 for alignment of pins 122 with tubes 114 during assembly of the upper end of the spindle. To provide access to pins 122 during assembly, sleeve 106 and shell 42 are apertured at 118. The parts in Fig. 14 are arranged for reception of the short pins, to be described later, from the lower end 126 of a chute from a mechanism (not shown) for supplying these short wires.

*Upper mold and pressure pad*

Figure 7:
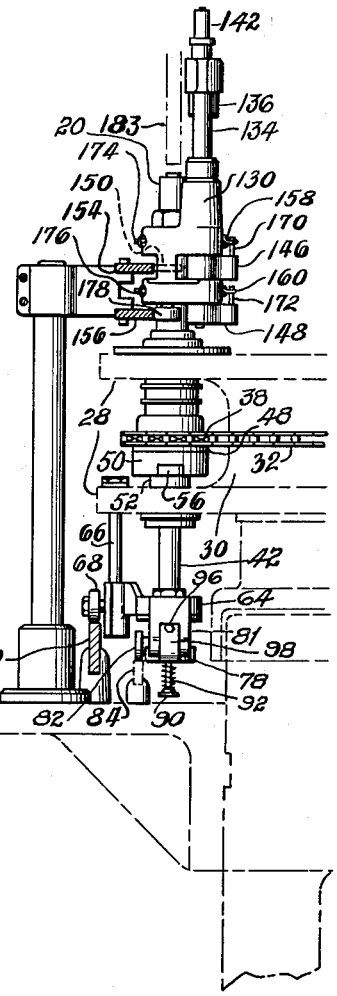
Fig. 7 is an elevation of the machine, showing a spindle and its coacting cam tracks, the latter being in section.

Bearing block 130 supporting upper mold 22 and pad 24 is held by a taper pin 131 for rotation with outer sleeve 40 of the spindle in coaxial relation therewith, and against relative vertical motion. Block 130 contains a pair of bushings 132 in which sleeve 134 is rotatably mounted, and clamped to this sleeve is a supporting arm 136 for upper die 22. Within sleeve 134 are a pair of bearings 138 for swingably supporting shaft 140. To the top of this shaft there is secured a guide block 142 for slidably supporting shaft 144 which carries pad 24. Secured to the lower end of sleeve 134 and of shaft 140 are arms 146 and 148 which carry antifriction rollers 150 and 152 respectively for following cams 154 and 156. These arms are tensioned counterclockwise (Fig. 10) by coil springs 158 and 160 and are provided with adjustable stops 162 and 164 which bear against outer shell 40. Arms 146 and 148 are provided with lateral rearward extensions (Figs. 7 and 10) having upstanding pins 170 and 172. Tension springs 158 and 160 are connected between these upstanding pins and pins 174 and 176 (Figs. 1 and 9A) in bearing block 130. Extending from block 130 at the level of roller 152 is another cam follower roller 178.

*Cycle of operations*

As can be seen from Fig. 8, cam tracks 154 and 156 become effective, for laterally shifting upper mold 22 and pad 24, only after the driving relationship between the spindles and chain 32 has been interrupted. Thereafter the turret is successively indexed, carrying the spindles from position A to position F (Fig. 8) for removal of the completed work and for loading the materials required in each molding cycle.

At the time that the spindles are successively moved into position A (Figs. 8 and 9) they are in counterclockwise rotation. They continue to do so by virtue of their inertia, until engagement of stop 56 (rigid on the outer shell of of the spindle) with a spring actuated latch 180 which is pivotally supported at 181 to a stationary part adjacent the turret. This serves to orient cam followers 150, 152 and 178 properly in their approach to initial parts 154' and 156' of cam tracks 154 and 156. When a spindle is indexed from position A to position B, arm 146 is swung clockwise (Fig. 9) on bearings 132, thereby tensioning spring 158 and swinging upper mold 22 and its support 134 clockwise. Concurrently arm 148 is swung clockwise on bearings 138, tensioning spring 160 and swinging pad 24 and its support 142 clockwise for free access to lower mold 20. The tensioning of spring 160 is effective to press cam follower 178 against cam track 156, thereby orienting block 130, shell 40, and tubes 114 of the lower mold in a unique relationship with respect to the wire-feeding devices adjacent the turret. Likewise lower mold 20 is lifted by the action of cam 70 on roller 68. The various spindle parts remain in this configuration in stations B, C, and D. When the structure above lower mold 20 has been swung out of the way, removal of the completed work at station B is simplified. At station C short wires s are delivered into tubes 114, for abutment against the tops of rods 122, through multiple-channel feed-chute 126 (Fig. 14) from an intermittent wire feeding and cutting mechanism (not shown). At station D, glass stock in the form of a short tube g (Fig. 16) is delivered from a supply tube 183 (Fig. 7) to which it is fed by an escapement (not shown).

Figure 6:
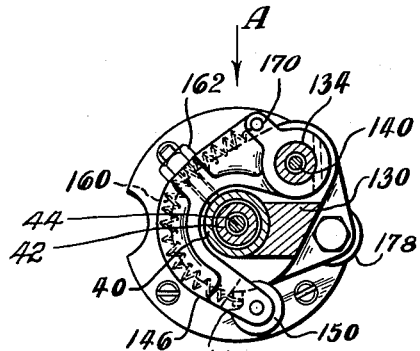

When a spindle is moved into station E arm 146 is swung counterclockwise by its spring 158 by reason of roller 150 reaching the end of cam track 154, until stop 162 reaches outer shell 40 (Fig. 6). In this manner, upper mold 22 is brought into vertical alignment with lower mold 20.

During the loading of the longer wires l at stations E and F, the lower mold is raised to a convenient height for loading by the action of cam 70 against follower 68. The wire supporting rods 122 are held in a lifted position by the action of cam 84 on roller 82 while the upper mold 22 is, due to the termination of cam track 154 just previous to station E, moved to an aligned position over mold 110. The through holes in upper mold 22 act as guides to promote the reliable feeding of the long wires from a feeding mechanism, not shown, into the holes in the bottom mold. Since the wire supporting rods 122 are in a raised position there is a minimum length of laterally unsupported wire between the top mold and the bottom mold. At the idle stations following station E and station F, the operator of the machine can insert wires manually in the event that the feeding mechanism failed in one or more channels.

After the loading operations have been completed roller 152 passes out of contact with cam track 156 and the respective pinions 38 move into driving relationship with chain 32 so that each spindle together with the supporting structure for its upper mold and pressure pad is rotated as a unit during the succeeding heating and pressing operations. Since cam track 156 terminates short of position G, arm 142 carrying the pressure pad 24 is shifted into axial alignment with lower mold 20 and upper mold 22 so that in successive operations as the long wires are lifted by the action of wire supporting rods 122, they are all constrained to move up and down together. Heating of the glass stock is started at position G by flames from burners which are not shown in Figure 8. The relative positions of molds 110, 22, pressure pad 24 and wire supporting rods 122 are shown in Figure 18. The height of cam track 70 at this point is such that lower mold 110 is spaced a considerable distance below upper mold 22. The upper mold supports the long wires against lateral motion while pad 24 weighs the wires down against rods 122. The top edge of the glass is fused by a series of progressively hotter burners and it is secured to the wires in a preliminary pressing operation at position H by lower mold 110 being brought up against upper mold 22 by the action of a raised portion on cam track 70 acting against roller 68. This raised portion of cam track 70 is identified as 70' in Figure 23 and its operation will be more fully explained with reference to that figure later. The spindles then pass through a plurality of further heating stations and finally reach station I. At this pressing position the same relative movement of molds 20 and 22 takes place. The glass being much softer at this position, a sort of a glass doughnut as shown at G' in Figure 20 is produced, having the wires more or less firmly sealed in the glass. A final pressing operation is effected at position J to shape the glass as shown at $G^2$ in Figure 11. After each pressing operation the cam follower 68 which rides on cam 70 is lowered, while the action of cam track 84 on cam follower 82 acting through lever 78 is reduced by the ratio of the length of the lever arms of lever 78 and causes the wire supporting rods 122 to lower to a lesser extent so that the wires and adhered glass are in effect maintained in a position above lower mold 20 to expose the glass to uniform heating and finally to annealing flames. The relative positioning between the molded glass and the lower mold at such times is shown in Figures 19, 20 and 21.

In order that the preliminary presses may accommodate variations in the extent of softening of the tubular glass stock, the mechanism for reciprocating the lower mold and the support rods 122 for the wires includes a yieldable component. Rigid cam tracks 70 and 84 are interrupted opposite positions H, I, and J, to include resiliently supported sections 70' and 84' (Fig. 23). These sections are on platform 192 carried by member 194 along bearings 196 in stationary support 198. Within a longitudinal hollow in member 194 is compression spring 200 which bears against platform 192 at its upper extremity and against a plug 202 at its lower extremity. In the bottom of support 198 is a screw 204 by means of which the spring pressure that is to be effective at the respective positions H, I or J can be delicately adjusted.

Sections 70' and 84' are mutually displaced in the direction of travel of their cam followers 68 and 82 (Fig. 1) in order that they may act in synchronism. This is because their respective cam-followers are mutually displaced in the direction of travel of the spindles.

Following each molding operation it is desired to exert downward pressure on the lower mold in order to overcome inertia effects. For this purpose an extension 206 is secured to the leading edge of each portion of cam track 70, in effect constituting a box cam, for positively lowering cam follower 68 and, with it, the lower mold.

During all of the heating and pressing operations, the spindles are in continuous rotation. When the drive has been interrupted and the spindles are oriented for proper coaction of the various cam followers with their cam tracks, the molded headers or the like are mechanically removed and the spindles are in condition for renewed automatic loading.

*Safety feature*

There is a possibility that latch 180 may, because of some abnormal condition, be prevented from properly orienting the spindles for engagement with cam tracks 154 and 156. For this reason sections 154' and 156' of cam tracks 154 and 156 are connected together by block 184 and pivotally mounted and maintained in proper operative position by a telescopic spring plunger 182 (Fig. 22) and connected together by block 184. Secured to plunger 182 is a sleeve 186 which is arranged to operate lever 188 of a safety switch 190. In the event that binding should occur, such as would force sections 154' and 156' of the cam tracks radially outward, the safety switch would be operated to disable the drive motors associated with the machine, and the machine would be shut down.

It should be remembered that the specific embodiment represents what is at present regarded as a preferred form of the invention in its several aspects. It would be futile to attempt to list all of the constructions which those skilled in the mechanic arts may substitute for the mechanism disclosed, for accomplishing the same or substantially the same purposes. Therefore we do not desire to have this patent construed more narrowly than in the appended claims.

What is claimed is:

1. The combination of upper and lower molds having concentric mounting means below said lower mold and mounted for rotation as a unit about a common axis and mounted on a carrier for translation successively through heating, pressing and loading zones, a support supporting said upper mold from said mounting means for relative lateral shifting with respect to said lower mold to render said lower mold accessible from above, and mechanism for relatively shifting and restoring said molds.

2. The combination of upper and lower molds having concentric mounting means below said lower mold and mounted as a unit for rotation about a common axis and mounted on a carrier for translation successively through heating, pressing and loading zones, a support on said mounting means carrying said upper mold for lateral shifting to render said lower mold accessible from above and cam and cam follower mechanism acting to rotate the support about an axis displaced from the axis of said mounting means to shift said top mold during its traverse through the loading zone.

3. The combination according to claim 2 including a drive coupled to said mounting means for rotating said molds while said molds are in vertical alignment, and means for arresting rotation of the molds by said drive during traverse of the molds by said carrier through the loading zone.

4. In a molding machine for making glass headers or the like having parallel wires sealed therein, a first mold penetrated by bores to receive said wires, a second mold to coact with the first mold and having a mounting means concentric with said first mold and mounted below said first mold, said molds and said mounting means being adapted to rotate about a common axis, a support for the ends of the wires in said first mold, a carrier for conveying said first and second molds successively past a first heating zone, a first pressing position to adhere the glass to the wires, a second heating zone, and a second pressing position, mechanism for mutually shifting said mounting means and said second mold relative to said first mold to render said first mold accessible from above for locating a glass charge within said first mold and a lifting means operating said support to space said glass from said first mold in said second heating zone after its adherence to the wires.

5. In a molding machine, a spindle including upper and lower molds and a pressure pad above said upper mold, said upper mold being completely penetrated for admitting wires, a carrier for moving said spindle past heating and pressing positions successively and past a zone for loading materials into said molds, means for supporting said pad for movement laterally of said upper mold, and a mechanism for shifting said supporting means to selectively move said pad between positions lateral to said upper mold to render said upper mold accessible for loading during traverse of said spindle through the loading zone and in alignment with said upper mold.

6. In a machine for molding glass headers or the like complete with metal leads, an upper mold, a lower mold having passages to receive the metal leads, said upper mold being supported by a spindle organization coaxial with and beneath said lower mold, means to heat said glass while the upper and lower mold members are separated, means for moving said molds through a plurality of positions, some of which are pressing positions at which said molds are urged toward each other, means operative at said positions for urging said molds toward each other, and a support for moving said wires relative to the lower mold to carry the partially molded glass out of contact with said lower mold and means for moving said support during an intermediate heating operation.

7. In a molding machine, a carrier, at least one spindle on said carrier, including a pair of rotatable and mutually reciprocable molds one with respect to the other, a support for holding one of said molds laterally movable relative to the other mold, a pair of cam followers on said spindle one of which is fixed to the support for said laterally movable mold and the other to a support for the other mold, a spring urging said cam followers toward each other, and stationary cam means adjacent the path of said spindle to spread said cam followers, thereby moving said one mold laterally.

8. A molding machine according to claim 7 wherein said other mold has cavities to receive inserts, and the said one cam follower serves the further purpose of orienting said cavities uniformly with respect to said carrier.

9. In a molding machine, a carrier, at least one spindle on said carrier comprising a first rotatable mold having a support, a second rotatable mold penetrated by bores to receive inserts, and having a support carried by said spindle for carrying said second mold and movable alternately in a position into axial alignment with said first mold and into a position of clearance out of axial alignment with said first mold, a pad above said second mold having a support, a cam follower carried by each of said supports, spring means urging said second mold and said pad into axial alignment with each other and with said first mold, and cam means adjacent the path of said spindle for shifting said cam followers one with respect to the other to move said pad and said second mold into said position of clearance.

10. A molding machine having a spindle including normally coaxial upper and lower molds, a carrier for moving said spindle cyclically through molding and loading zones, a stationary cam adjacent the carrier at least part of which is yieldably supported, cam-follower means on the spindle to shift the upper of said molds laterally during their traverse through said loading zone, and a control switch operated by said yieldably supported cam part whenever the cam-follower means abnormally resists operation by said cam part.

11. A machine for making a vitreous disc with lead wires sealed through said disc including a two-part press mold for forming said disc from heated glass tubing, registering holes in the two parts of said molds for receiving the said lead wires, said two parts being mounted one above the other, means for pressing said parts together, and means for simultaneously rotating said two parts about a common axis, said means including a coaxial spindle drive beneath the lower of said two parts and carrying the upper of said parts, and means for laterally shifting the upper of said two parts out of alignment with the lower.

12. A machine for making a vitreous disc with lead wires sealed through said disc including a two-part press mold for forming said disc from heated glass tubing, registering holes in the two parts of said mold for receiving the said lead wires, said two parts being mounted one above the other, and means for simultaneously rotating said two parts about a common axis, said means including a coaxial spindle drive beneath the lower of said two parts and carrying the upper of said parts, means for reciprocating one of said molds in to and out of pressing engagement with the other, and means for laterally shifting the upper of said two parts out of alignment with the lower.

13. A machine for making a vitreous disc with lead wires sealed through said disc including a two-part press mold for forming said disc from heated glass tubing, registering holes in the two parts of said mold for receiving said lead wires, said two parts being mounted one above the other, and means for simultaneously rotating said two parts about a common axis, said means including a coaxial spindle drive beneath the lower of said two parts and carrying the upper said parts, means for reciprocating one of said molds in to and out of pressing engagement with the other, means for separately reciprocating said lead wires relative to the lower of said molds, and means for laterally shifting the upper of said two parts out of alignment with the lower.

14. A molding machine having a carrier and a number of spindles mounted on said carrier for translation successively through heating, pressing and loading zones, each of said spindles including upper and lower molds having concentric mounting means below said lower mold and said molds being arranged for rotation as a unit about an axis in common with said spindle, a support for said upper mold carried by the concentric mounting means for said upper mold and supporting said upper mold for relative lateral shifting with regard to said lower mold to render said lower mold accessible from above, and cam and cam follower mechanism for relatively shifting and restoring said molds.

15. A molding machine having upper and lower molds, concentric mounting means below said lower mold for supporting said molds, means for mounting said molds for rotation as a unit about their common central axis, a carrier for said molds, said molds being mounted on said carrier for translation successively through heating, pressing and loading zones, a support carried by said mounting means for said upper mold adapted for lateral shifting to render said lower mold accessible from above, and mechanism for shifting said top mold laterally during its traverse through the said loading zone.

16. The combination according to claim 15 including a rotatable means for supporting said concentric mounting means, drive means coupled to said rotatable means for rotating said molds and means for arresting rotation of said rotatable means by said drive operated in timed relationship with the operation of the mechanism for shifting said top mold.

References Cited in the file of this patent

UNITED STATES PATENTS

| | | |
|---|---|---|
| 872,530 | Meeker | Dec. 3, 1907 |
| 1,640,442 | De Jong | Aug. 30, 1927 |
| 2,058,880 | Hunt | Oct. 27, 1936 |
| 2,066,856 | Rose, Jr. | Jan. 5, 1937 |
| 2,195,483 | Franke | Apr. 2, 1940 |
| 2,238,198 | Weber | Apr. 15, 1941 |
| 2,296,347 | Hinkley et al. | Sept. 22, 1942 |
| 2,312,003 | Schneider et al. | Feb. 23, 1943 |
| 2,426,990 | Ellefson | Sept. 9, 1947 |